US011207966B2

(12) United States Patent
Aikawa et al.

(10) Patent No.: US 11,207,966 B2
(45) Date of Patent: Dec. 28, 2021

(54) POWER TRANSMISSION DEVICE

(71) Applicant: GKN Automotive Ltd., Birmingham (GB)

(72) Inventors: Masashi Aikawa, Tochigi (JP); Takayuki Matsumoto, Tochigi (JP); Atsushi Kawano, Tochigi (JP); Son Duy Nguyen, Tochigi (JP)

(73) Assignee: GKN Automotive Limited, Birmingham (GB)

( * ) Notice: Subject to any disclaimer, the term of this patent is extended or adjusted under 35 U.S.C. 154(b) by 0 days.

(21) Appl. No.: 17/030,561

(22) Filed: Sep. 24, 2020

(65) Prior Publication Data

US 2021/0001708 A1 Jan. 7, 2021

Related U.S. Application Data

(60) Division of application No. 16/174,799, filed on Oct. 30, 2018, now Pat. No. 10,828,977, which is a
(Continued)

(51) Int. Cl.
*B60K 6/387* (2007.10)
*F16H 57/037* (2012.01)
(Continued)

(52) U.S. Cl.
CPC .............. *B60K 6/387* (2013.01); *B60K 6/36* (2013.01); *B60K 6/40* (2013.01); *B60K 6/405* (2013.01);
(Continued)

(58) Field of Classification Search
CPC .......... B60K 3/36; B60K 6/387; B60K 6/442; B60K 6/52; B60K 17/16; B60K 17/02;
(Continued)

(56) References Cited

U.S. PATENT DOCUMENTS

2002/0060099 A1 5/2002 Takenaka et al.
2008/0076616 A1 3/2008 Kidokoro et al.
(Continued)

FOREIGN PATENT DOCUMENTS

CN 102007011 A 4/2011
CN 102745058 A 10/2012
(Continued)

OTHER PUBLICATIONS

International Search Report and Written Opinion for PCT/JP2016/071836 dated Oct. 11, 2016 (10 pages; with English translation).
(Continued)

*Primary Examiner* — Stacey A Fluhart
(74) *Attorney, Agent, or Firm* — Bejin Bieneman PLC

(57) ABSTRACT

A power transmission device outputting torque from a first power source and a second power source to axles, is provided with: a first shaft coupled with the first power source; a differential configured to differentially distribute the torque to the axles; a first gear set configured to drivingly couple the first shaft with the differential; a second shaft coupled with the second power source; a second gear set drivingly coupled with the second shaft; a clutch configured to receive fluid pressure to drivingly and releasably couple the second gear set with the first gear set; and a pump driven by a third power source at least independent of the first power source and the clutch to generate the fluid pressure, the pump being disposed separate from the clutch and in fluid connection with the clutch to supply the fluid pressure.

5 Claims, 11 Drawing Sheets

Related U.S. Application Data continuation of application No. PCT/JP2016/071836, filed on Jul. 8, 2016, which is a continuation-in-part of application No. PCT/JP2016/070232, filed on Jul. 8, 2016.

(51) Int. Cl.

| | | |
|---|---|---|
| *B60K 6/36* | (2007.10) | |
| *B60K 17/02* | (2006.01) | |
| *B60K 17/16* | (2006.01) | |
| *B60K 6/405* | (2007.10) | |
| *F16H 57/04* | (2010.01) | |
| *F16D 48/02* | (2006.01) | |
| *B60K 6/40* | (2007.10) | |
| *B60K 6/442* | (2007.10) | |
| *B60K 6/52* | (2007.10) | |
| *F16D 25/12* | (2006.01) | |
| *F16H 57/02* | (2012.01) | |
| *F16H 63/34* | (2006.01) | |
| *F16D 25/0638* | (2006.01) | |

(52) U.S. Cl.
CPC ............... *B60K 6/442* (2013.01); *B60K 6/52* (2013.01); *B60K 17/02* (2013.01); *B60K 17/16* (2013.01); *F16D 25/12* (2013.01); *F16D 25/14* (2013.01); *F16H 57/037* (2013.01); *F16H 57/045* (2013.01); *F16H 57/0423* (2013.01); *F16H 57/0424* (2013.01); *F16H 57/0428* (2013.01); *F16H 57/0441* (2013.01); *F16H 57/0476* (2013.01); *F16H 57/0483* (2013.01); *F16H 57/0495* (2013.01); *B60W 2720/403* (2013.01); *F16D 25/0638* (2013.01); *F16H 63/3483* (2013.01); *F16H 2057/02034* (2013.01)

(58) Field of Classification Search
CPC ............... F16H 57/037; F16H 57/0476; F16H 57/0483; F16H 57/0495; F16H 63/3483; F16D 25/12; F16D 25/14; F16D 25/0638
See application file for complete search history.

(56) References Cited

U.S. PATENT DOCUMENTS

| | | |
|---|---|---|
| 2010/0109461 A1 | 5/2010 | Kato et al. |
| 2012/0266704 A1 | 10/2012 | Masayuki |
| 2013/0062980 A1 | 3/2013 | Kuwahara et al. |
| 2014/0374211 A1 | 12/2014 | Date |
| 2015/0080162 A1 | 3/2015 | Motoyama |
| 2016/0230817 A1 | 8/2016 | Kleinhardt |
| 2017/0087975 A1* | 3/2017 | Cimatti .................... B60K 6/48 |
| 2019/0270373 A1* | 9/2019 | Ogino ................ B60W 30/188 |

FOREIGN PATENT DOCUMENTS

| | | |
|---|---|---|
| CN | 104136255 A | 11/2014 |
| CN | 104442344 A | 3/2015 |
| EP | 2284030 A1 | 2/2011 |
| EP | 2857243 A2 | 4/2015 |
| JP | 2002120575 A | 4/2002 |
| JP | 2009072052 A | 4/2009 |
| JP | 2010001944 A | 1/2010 |
| JP | 2010105615 A | 5/2010 |
| JP | 2010247786 A | 11/2010 |
| JP | 2011240893 A | 12/2011 |
| JP | 2013180680 A | 9/2013 |
| JP | 2014145409 A | 8/2014 |
| JP | 2015054670 A | 3/2015 |
| JP | 2016117402 A | 6/2016 |
| WO | 2015083700 A1 | 6/2015 |

OTHER PUBLICATIONS

International Search Report and Written Opinion for PCT/JP2016/070232 dated Oct. 11, 2016 (9 pages; with English translation).
Extended European Search Report for EP16908204 dated Feb. 5, 2020 (10 pages).
Chinese Office Action for Application No. CN201680085333.6 dated Dec. 14, 2020 (14 pages; with English machine translation).

\* cited by examiner

POWER TRANSMISSION DEVICE

CROSS-REFERENCE TO RELATED APPLICATIONS

This application is a divisional application of, and claims priority to, U.S. patent application Ser. No. 16/174,799 (filed on Oct. 30, 2018), which is a continuation application of, and claims priority to, PCT International Application No. PCT/JP2016/071836 (filed Jul. 26, 2016), which is in turn based upon and claims the benefit of priority from PCT International Application No. PCT/JP2016/070232 (filed Jul. 8, 2016), the entire contents of each of which are incorporated herein by reference in their respective entireties.

BACKGROUND

In recent years, vehicles each employing two or more power sources in combination are appearing on the market, with the intent to improve energy efficiency. A typical example thereof are so-called "hybrid vehicles". Output of a combustion engine is used for not only driving axles but also charging a battery and then a motor functions as a generator, receiving part of the output of the combustion engine to generate electric power. Further, in many cases, during deceleration, the motor functions as a generator, using inertial energy of the vehicle for regenerating electric power. Specifically, it is necessary to interchange torque tri-directionally among two or more power sources and axles. A device therefor tends to be complex and large-scale in order to realize such power transmission. On the other hand, as an engine compartment must accommodate two or more power sources, only a smaller space remains available as compared with conventional vehicles. Layout of two or more power sources and the power transmission device in a limited space causes a quite difficult issue in a vehicle where free spaces are hardly found.

Japanese Patent Application Laid-open No. 2009-072052 discloses a related art.

SUMMARY

The present disclosure relates to a power transmission device for transmitting torque to axles in a vehicle powered by two or more electric motors or combustion engines in combination. In a hybrid vehicle having an electric motor as a main power source, the electric motor inherently has large dimensions and occupies a considerable volume in the engine compartment. Given that the electric motor is disposed at the left in the engine compartment and the combustion engine as a sub power source is disposed at the right in parallel with the electric motor, only a narrow gap remains available therebetween for disposing (placing) the power transmission device. In addition, to cut off the combustion engine as the sub power source from the driving system, a clutch and an actuator for driving it are required to be loaded on the power transmission device. As these elements reach certain sizes, particularly in the lateral direction, the issue of layout becomes far more troublesome. The device described hereinafter has been created in light of these problems.

According to an aspect, a power transmission device outputting torque from a first power source and a second power source to axles, is provided with: a first shaft coupled with the first power source; a differential configured to differentially distribute the torque to the axles; a first gear set configured to drivingly couple the first shaft with the differential; a second shaft coupled with the second power source; a second gear set drivingly coupled with the second shaft; a clutch configured to receive fluid pressure to drivingly and releasably couple the second gear set with the first gear set; and a pump driven by a third power source at least independent of the first power source and the clutch to generate the fluid pressure, the pump being disposed separate from the clutch and in fluid connection with the clutch to supply the fluid pressure.

DESCRIPTION

Exemplary embodiments will be described hereinafter with reference to FIG. 1 through FIG. 11.

In these drawings, a reference sign F denotes forward, A aftward, R rightward, L leftward, U upward and D downward, respectively. These distinctions are, however, merely for convenience of explanation and any modified embodiments by interchanging the right and the left, or the front and the rear, are possible.

Figure 1:
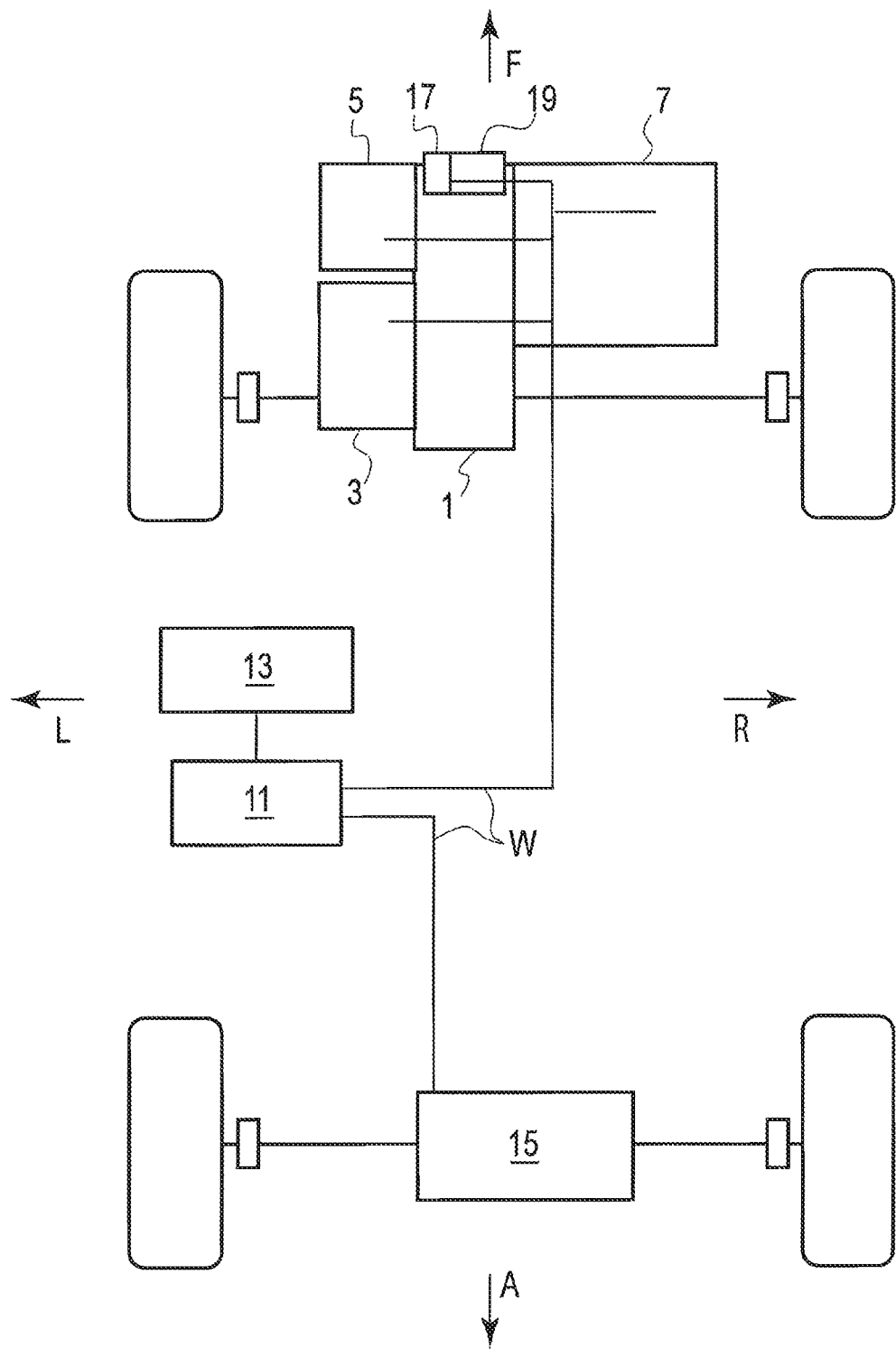
FIG. 1 is a general block diagram of a vehicle.

A power transmission device of the present embodiment is used for transmitting torque tri-directionally among a first power source (an electric motor), a second power source (a combustion engine including a generator) and axles, and is applicable to a hybrid vehicle for instance. FIG. 1 illustrates an example in which the power transmission device is applied to front axles of a hybrid vehicle but is instead applicable to rear axles, of course.

Referring to FIG. 1, the vehicle is generally provided with a power transmission device 1 for driving the front axles, and a gear box 15 for the rear axles. While the gear box 15 includes a differential for allowing differential motion between the right and left axles, it may further includes an electric motor for driving the rear axles or any other devices. In order to realize electronic control, an electric control unit (ECU) 11 is connected to the respective elements via the wiring W is. A battery 13 is connected to the ECU 11 to supply electricity to the respective elements via the wiring W.

An electric motor 3, a generator 5, and a combustion engine 7 are coupled to the power transmission device 1 coupled as either its components or external elements. The electric motor 3 is a main power source for driving the vehicle in this embodiment, and the combination of the combustion engine 7 and the generator 5 is a sub power source. While details will be described later, the electric motor 3 is steadily and drivingly coupled with the front axles via a gear set, whereas the combination of the combustion engine 7 and the generator 5 gets drivingly coupled therewith only when the clutch 9 gets connected.

The combustion engine 7, as described already, functions as the sub power source and further drives the generator 5 to make it generate electricity. The combustion engine 7, as well known, can be a gasoline engine or a diesel engine, but any internal-combustion engine of another type is available and instead an external-combustion engine may be used if possible.

Electricity generated by the generator 5 is used for charging the battery 13 and is further supplied via the battery 13 to the generator 5 for itself, the electric motor 3, and various electric components for operation thereof. Further, the electricity may be input to the generator 5 so as to use the generator 5 for starting the combustion engine 7.

Meanwhile, the electric motor 3 is at a time of decelerating the vehicle used for generating electricity to recycle energy, and the electricity can be input to the generator 5 to drive the vehicle as well. Specifically, aside from the factors of the capacities and the dimensions, there's no difference in functionality between the electric motor 3 and the generator 5.

Figure 2:
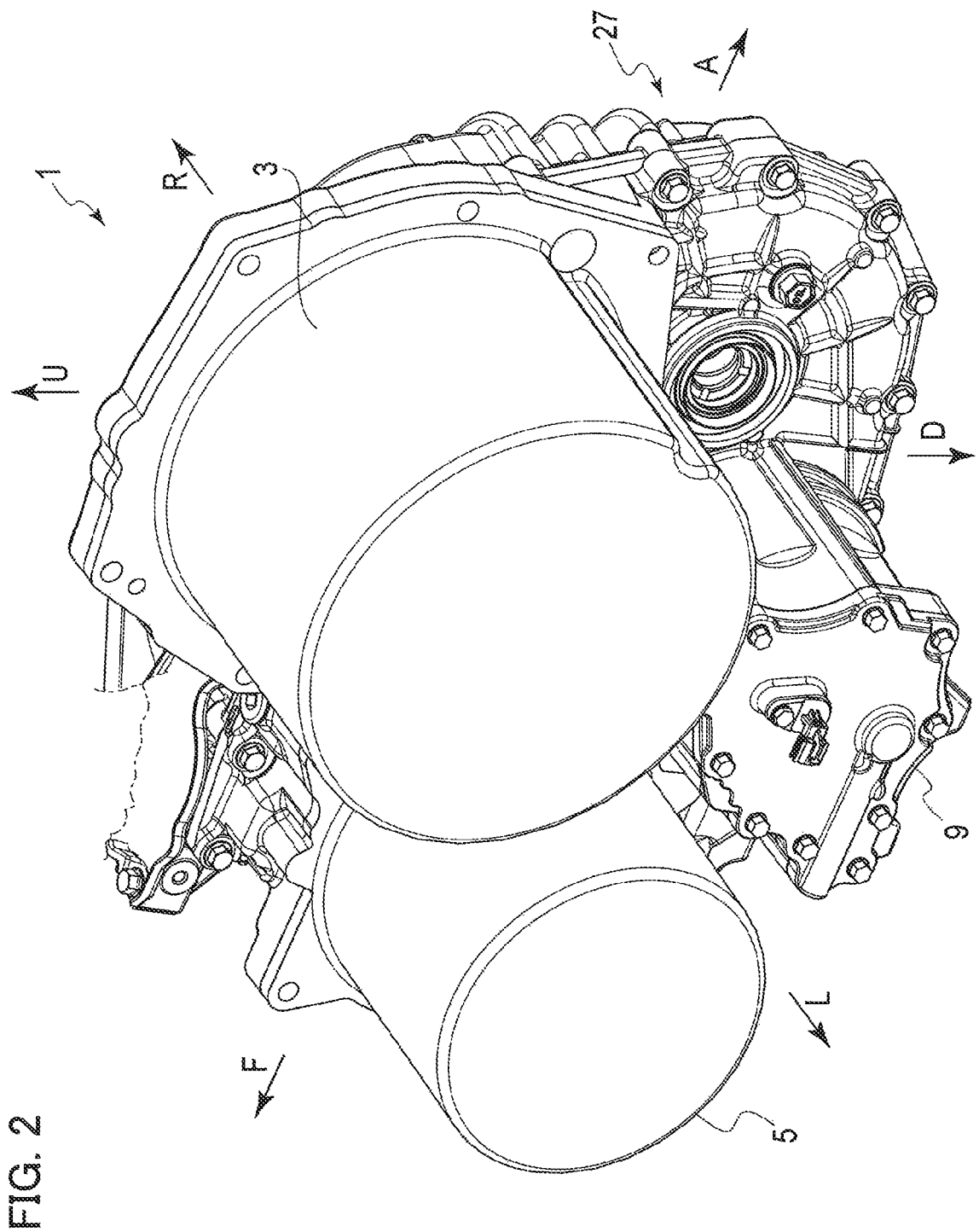
FIG. 2 is a perspective view of a power transmission device according to an embodiment.
Figure 3:
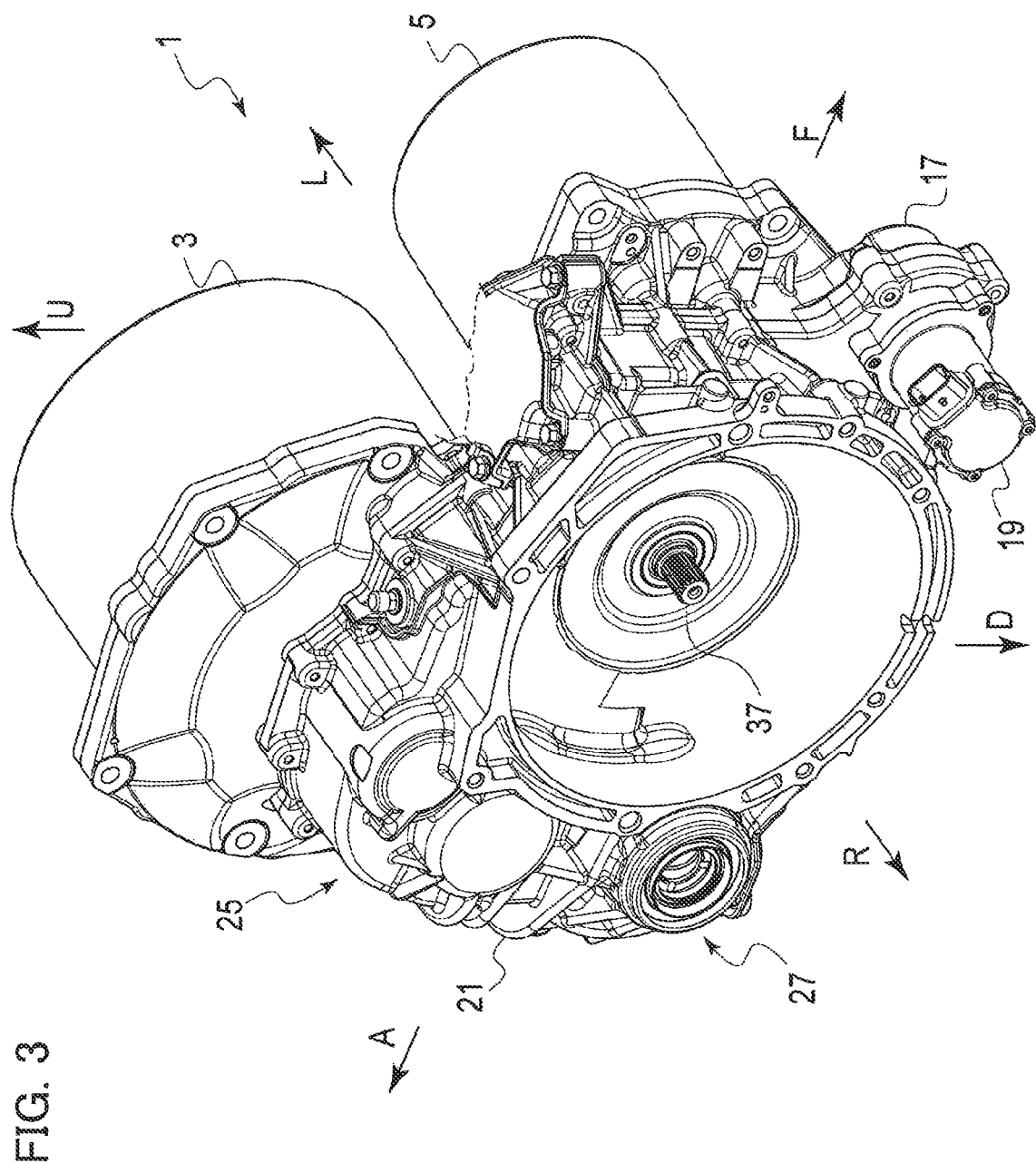
FIG. 3 is another perspective view of the power transmission device, which shows a side opposite to that of FIG. 2.

Referring to FIG. 2, the electric motor 3 and the generator 5 for instance are disposed at a same side in the power transmission device relative to the casing 21, and may further form a unitary body with the casing 21, and are further in the interior thereof. The electric motor 3 and the generator 5 may be arranged to have these shafts parallel with each other and may be separate bodies fixed to the transmission device 1 by means of bolts or such. The combustion engine 7 may be so arranged as to have its rotary shaft parallel with the shafts of the electric motor 3 and the generator 5, and is coupled with a drive shaft 37 led out of the casing 21 via a spline coupling. An electric motor 19 (third power source) for driving a pump 17 described later may be disposed at the same side as the combustion engine 7.

The arrangement of components or parts as shown in the drawing may be modified and some variations will occur. The generator 5 may be disposed at a same side as the combustion engine 7 relative to the casing 21 for instance and they may be further disposed coaxially with each other. Further, the electric motor 3 and the generator 5 may be coaxial with each other.

Figure 4:
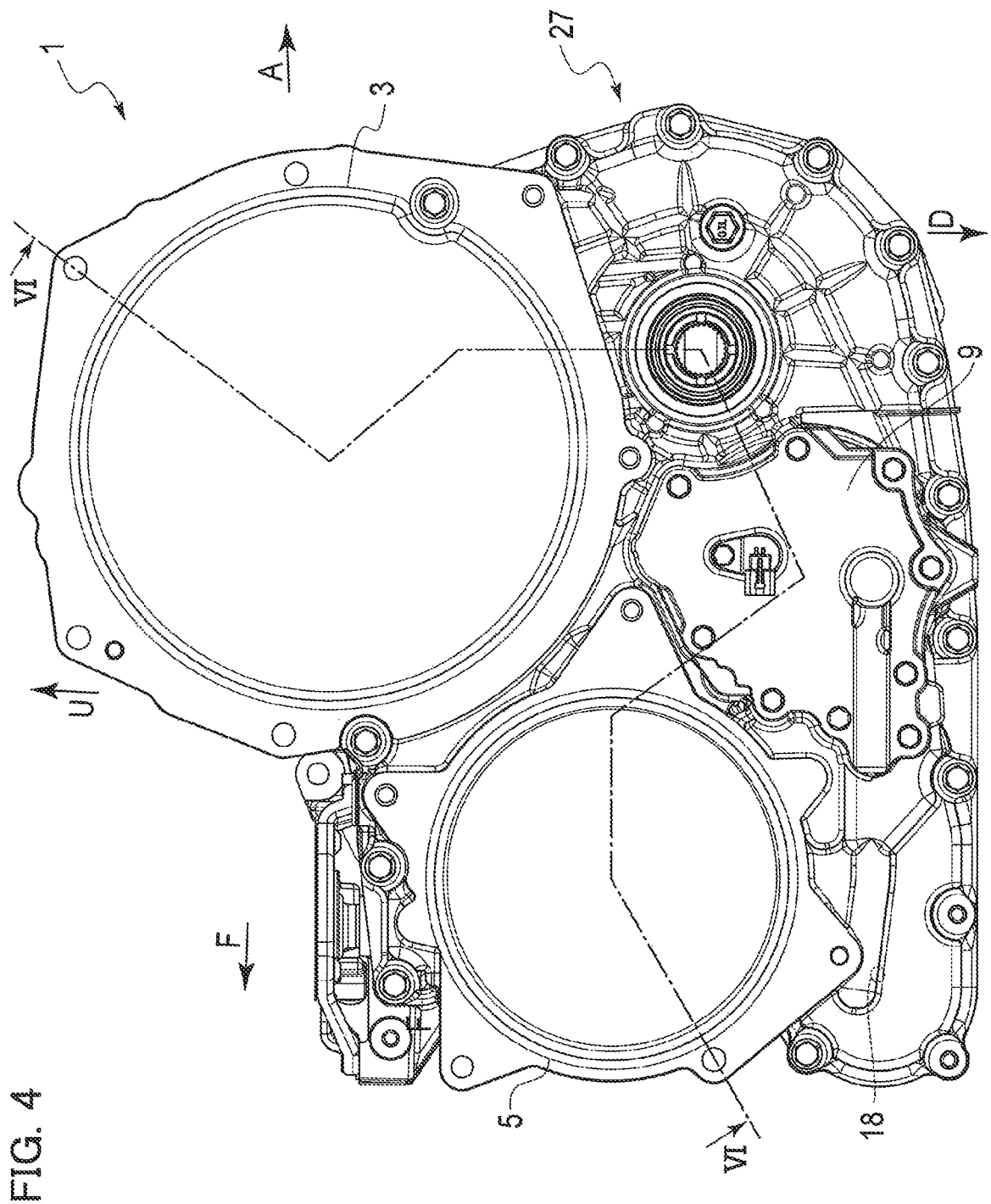
FIG. 4 is a side view of the power transmission device.
Figure 5:
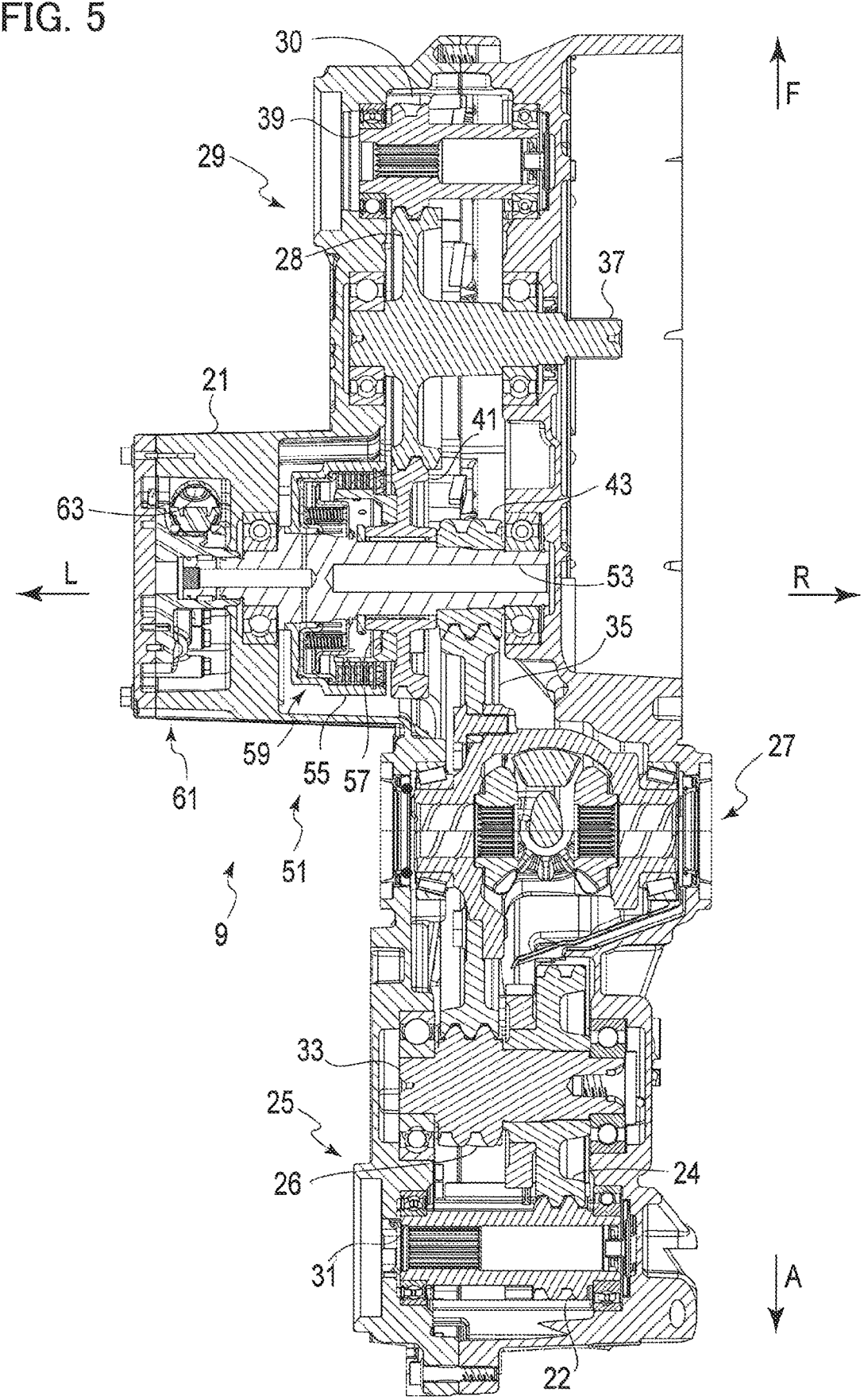
FIG. 5 is a sectional view of the power transmission device, taken from a line VI-VI of FIG. 4.

Referring to FIGS. 4, 5, the power transmission device 1 is in general provided with a first gear set 25 drivingly coupled with the electric motor 3, a differential 27 that differentially distributes torque to the right and left front axles, and a second gear set 29 drivingly coupled with the combustion engine 7 and the generator 5. Side gears of the differential 27 are respectively in faces of both sides of the casing 21 of the power transmission device 1, and are respectively spline-coupled with the right and left front axles. The differential 27 can be a differential gear set of the bevel gear type as shown in the drawings, but instead could be a differential gear set of any type. Alternatively, in place of the differential gear set, a clutch pack assembly capable of controlling right and left axles independently may be used.

The casing 21 is dividable into two or more parts that are yet combinable with each other by means of bolts or such. When coupled together, the casing 21 defines a single space that houses and rotatably supports the respective shafts, the differential 27, the gear sets 25, 29, the pump 17 and the clutch 9. While it has some openings for coupling with the axles and the power source, they can be sealed by any sealing means, thereby preventing internal lubricant oil from leaking out.

The first gear set 25 is steadily and drivingly coupled with the differential 27 so that the torque is bidirectionally interchanged between the electric motor 3 and the axles. On the other hand, the second gear set 29 and the differential 27 have the clutch 9 interposed therebetween and thereby can be decoupled. Thus the combustion engine 7 and the generator 5 take part in drive of the axles only when the clutch 9 gets connected.

In more detail, the power transmission device 1 is provided with a first drive shaft 31 drivingly coupled with the electric motor 3 and its end is in face of the exterior of the casing 21. This end may be provided with splines for coupling. The first drive shaft 31 is further provided with a pinion 22 as a unitary body therewith or a separate body therefrom, thereby coupling with a ring gear 35 of the differential 27. An intermediate shaft 33 having a ring gear 24 and a pinion 26 may be interposed therebetween. These mutually meshing gears constitute the first gear set 25. These gears can be helical gears but instead spur gears or any gears of any other types is possible.

To operate the electric motor 3 in a higher speed range, the first gear set 25 may be constituted as a reduction gear. The first gear set 25, via the ring gear 35, rotates the differential 27 so that the torque from the electric motor 3 is differentially distributed to the right and left axles.

The power transmission device 1 is further provided with a second drive shaft 37 and its end is led out of the casing 21 to get coupled with the combustion engine 7. This end may be provided with splines for coupling. Between the combustion engine 7 and the shaft 37, any other device such as a dry clutch or a torque damper may be interposed.

The generator 5 is coupled with the second drive shaft 37 directly, or a driven shaft 39 as a separate body therefrom. The driven shaft 39 may be also provided with splines around its end. The drive shaft 37 is provided with a ring gear 28 as a unitary body therewith or a separate body therefrom, and correspondingly the driven shaft 39 is provided with a pinion 30 in mesh therewith, so that these elements constitute the second gear set 29. These gears can be helical gears but instead spur gears or gears of any other types, too.

To operate the generator 5 in a higher speed range, the second gear set 29 may be constituted as a reduction gear when viewed from the generator 5. The second gear set 29 may be, when viewed from the combustion engine 7, constituted as an isokinetic or acceleration gear.

A ring gear 41 fits on and is rotatable relative to a shaft 53 of the clutch 9 and the ring gear 41 is in mesh with the second gear set 29. A pinion 43 in mesh with the ring gear 35 of the differential 27 is splined-coupled with the shaft 53 and may be so disposed as to be axially adjacent to the ring gear 41.

As being understood from FIG. 5 in particular, all these shafts may be parallel to each other and these gears may be arranged around a single plane perpendicular to these shafts. Therefore, the totality of the power transmission device 1 can be formed in a prominently compact form in the lateral direction. Further, as will be understood from FIG. 4 in particular, these shafts are not necessarily arranged in an identical plane, and for instance the first drive shaft 31 may be disposed above the second drive shaft 37 and the differential 27 and the shaft 53 of the clutch 9 may be disposed below. The shafts 31, 37 can be thereby made closer to each other so that the totality of the power transmission device 1 can be made smaller in both the longitudinal direction and the vertical direction.

Referring again to FIG. 5, the clutch 9 is provided with a clutch drum 55 fixedly coupled with the shaft 53, and a clutch hub 57 fixedly coupled with the ring gear 41 while these elements are coaxial and nested. Plural clutch plates respectively coupled with the clutch drum 55 and the clutch hub 57 are alternated in a row and thereby constitute a multi-plate clutch. Alternatively, in place of the multi-plate clutch applicable is a clutch of any other type, such as a proper friction clutch, a spline clutch, a dog clutch or a synchro-cone clutch.

To load pressure force axially on the clutch 9, any fluidic pressure, such as hydraulic pressure supplied by the pump 17, can be used. A reservoir 61 may be coupled with one end of the clutch 9 in order to reserve pressurized fluid. In the interior of the reservoir 61, a flow path 69 as described below is opened, and thereby the pressurized fluid supplied by the pump 17 fills the interior. The interior of the reservoir 61 is in fluid communication with the interior of the clutch drum 55 through a flow path passing through the shaft 53. The reservoir 61 may further contain an accumulator, which is beneficial in retaining constant pressure. This eliminates the need to constantly operate the power source for pressurizing and thus leads to suppression of energy loss.

As the pump 17 exerting the pressure force via the reservoir 61, the clutch 9 gets connected, and gets disconnected when the pressure force is removed. For the purpose of switching between exertion and removal of the force, the flow path 69 may be provided with an on/off valve 63 and an ECU 11 may execute control to open and close the valve 63.

Figure 6:
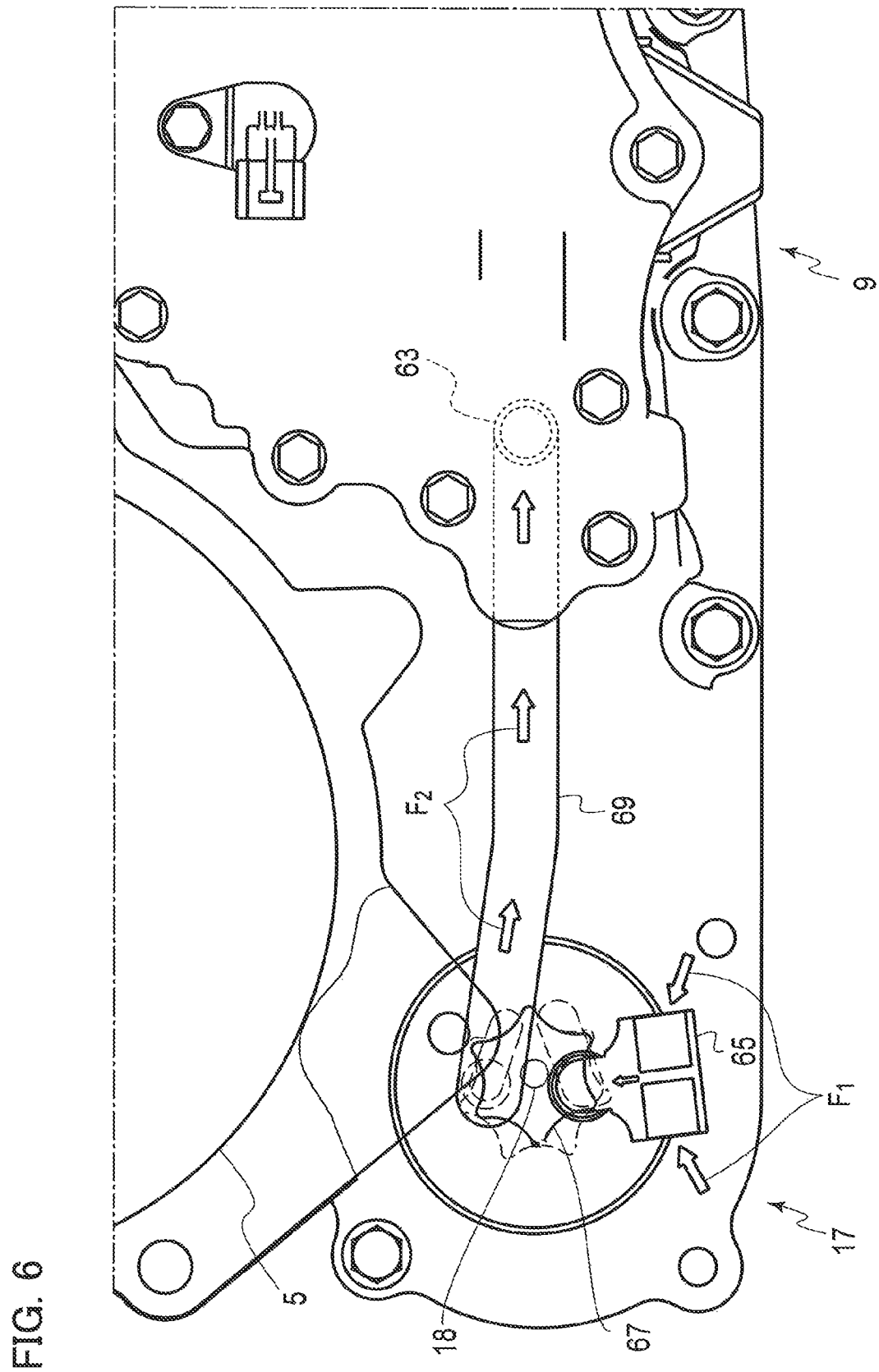
FIG. 6 is a side view in which a hydraulic device and elements therearound are enlarged.

Referring to FIG. 6 in combination with FIGS. 4 and 5, the pump 17 can be disposed at a same side as the clutch 9 relative to the casing 21 but apart from the clutch 9. The casing 21 is provided with the flow path 69, and the flow path 69 sets the pump 17 in fluid communication with the reservoir 61 of the clutch 9. As the pump 17 is separate from the reservoir 61, the clutch 9 is relatively small-sized in the axial direction and this contributes to reduction in size of the totality of the power transmission device 1 in its lateral direction. The flow path 69, in its entirety, may penetrate the casing 21 or may partly contain a separate pipe that may be joined with the exterior or the interior of the casing 21. Any of them may be freely selected in light of the convenience of production or the freedom of design.

The pump 17 is disposed at a properly low location on the casing 21, for instance below the generator 5. This location is close to the lowermost point in the casing 21, which functions as an oil reservoir to which operating oil F1 drains down after driving the clutch 9. The pump 17, preferably through a strainer 65, sucks up the operation oil F1, pressurizes it by means of rotation of a rotor 67, and supplies pressurized fluid F2 through the flow path 69 to the reservoir 61.

As will be understood from FIG. 6, the pump 17 and the reservoir 61 can be disposed approximately at a same height and the flow path can be approximately horizontal. In the process of sucking up the operation oil, pressurizing and supplying it through the flow path 69 to the reservoir 61, the operation oil experiences a small height difference and therefore pressure loss is minimized. Specifically, this arrangement prominently contributes to suppression of energy loss.

The pump 17 applicable could be any of a gear pump, a vane pump and a plunger pump. In any case, projection of the pump 17 from the casing 21 can be sufficiently smaller than projection of the generator 5 and the other elements.

Any power source can be used to operate the pump 17. The rotor 67 for instance may be drivingly coupled with the shaft 53, the differential 27 or the first gear set 25, so that the electric motor 3 or the pump 17 can be used as the power source. In these cases, however, when the vehicle stops, the pump 17 accordingly stops so that the fluid pressure in the reservoir 61 cannot be retained anymore and then the clutch 9 cannot be connected. It is preferable to use any power source independent from these elements in order to operate the clutch 9 even when the vehicle stops.

As such a third power source, the electric motor 19 as described already can be used. The electric motor 19 can be reduced in size as compared with the other power source because it requires only small output. Thus projection of the electric motor 19 from the casing 21 can be made sufficiently small as compared with projection of the generator 5 and the other elements. The electric motor 19 may be disposed at another side opposed to the pump 17 relative to the casing 19, and its shaft 18 may be led through the casing 21 and coupled directly with the rotor 67. The combination of the electric motor 19 and the pump 17 therefore does not occupy a great space of the power transmission device 1 in the lateral direction.

Using the electric motor 19 allows freedom of selection in the arrangement of the pump 17 and, as shown in FIG. 4, the pump 17 along with the clutch 9 can be disposed lower than the axes of the first drive shaft 31, the second drive shaft 37 and the differential 27. As this location is a dead space, this arrangement does not compress free space in the engine compartment. Further, as this location receives air flow when the vehicle runs, this is significantly beneficial in cooling the electric motor 19 and the pump 17. Durability of the fluid pressure system including them as a whole is improved. Further, it is easy to select arrangements of the electric motor 19 and the pump 17 so as to avoid interference by circumferential moving components.

Further, as the electric motor 19 is always ready to run by using electric power stored in the battery 13, the clutch 9 is also ready to be driven even when the vehicle stops or the combustion engine 7 stalls. As the sub power source is ready to be used as quick as needed to drive the vehicle, this contributes to improvement of response of the vehicle to operation by the driver. Operation of the clutch 9 is directly controlled by on-and-off of the electric power applied to the pump 17 so that it does not need provision of a valve for controlling the hydraulic circuit.

An on/off valve may of course be used. In particular, combining the on/off valve with an accumulator leads to reduction in necessity of operation of the electric motor 19, thereby reducing energy loss. Further operation of the clutch 9 can be made quicker.

Alternatively, the rotor 67 may be disposed close to the generator 5 and be then drivingly coupled with the rotor 67 via the gear set, thereby using the generator 5 as a power source for the pump 17. Even in this case, the clutch 9 can be driven even when the vehicle stops or runs.

Referring mainly to FIGS. 7 through 11, another embodiment will be described below. As already described above, to operate the pump 17, in place of the electric motor 19, another power source independent from the electric motor 3 and the clutch 9 can be used, and in this embodiment the generator 5 and/or the combustion engine 7 is used as the power source.

Figure 7:
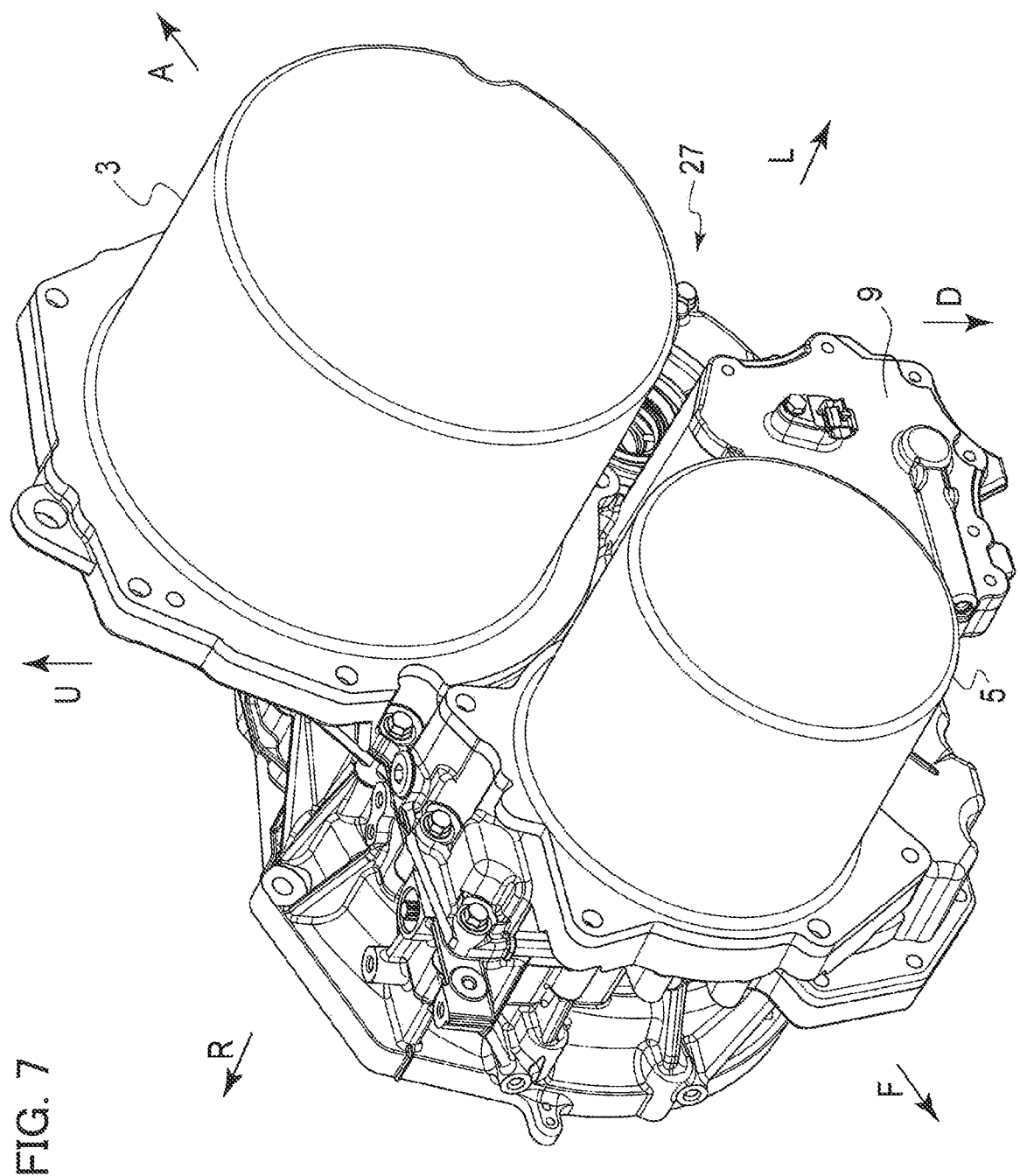
FIG. 7 is a perspective view of a power transmission device according to another embodiment.
Figure 8:
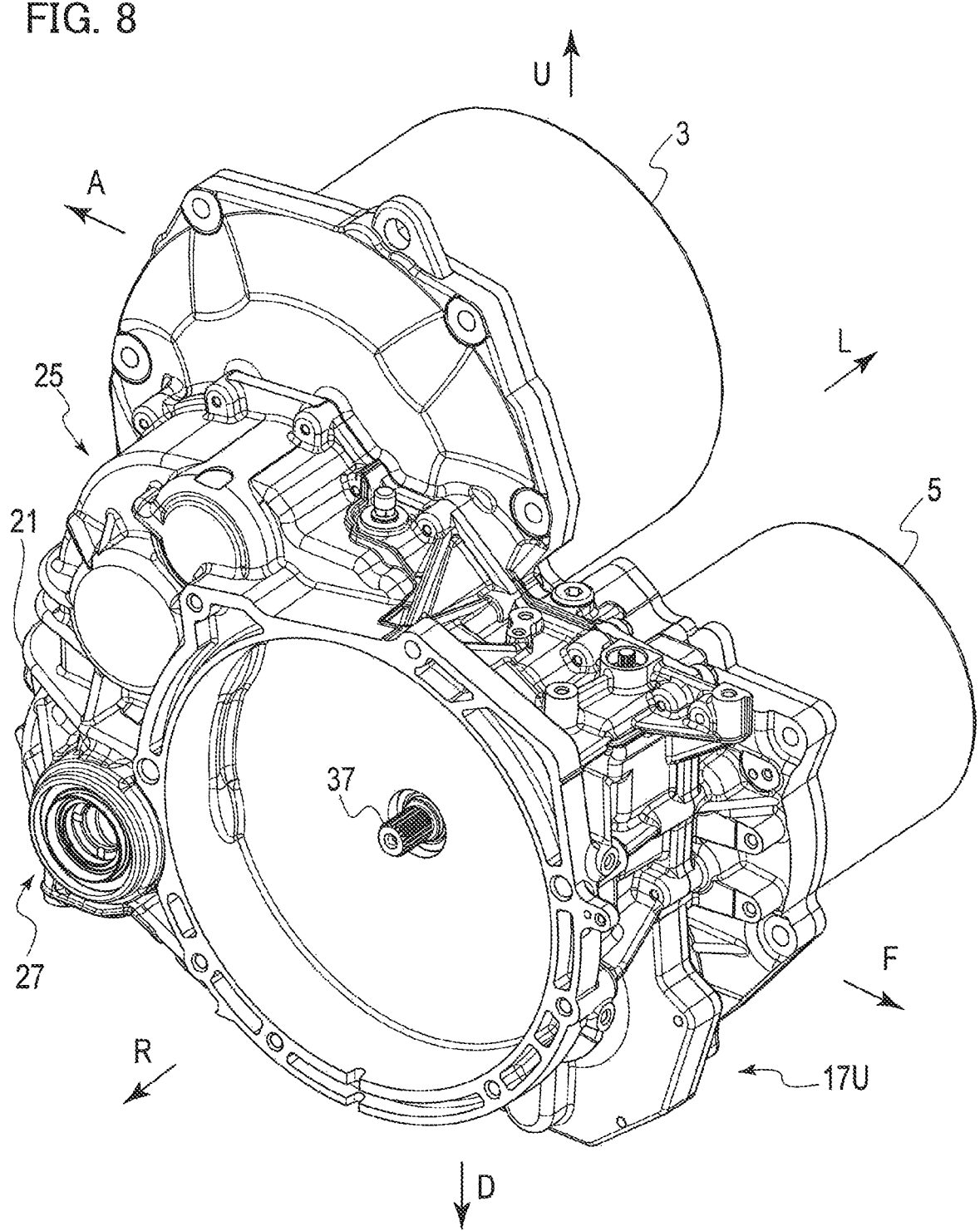
FIG. 8 is another perspective view of the power transmission device shown in FIG. 7, which shows a side opposite to that of FIG. 7.
Figure 9:
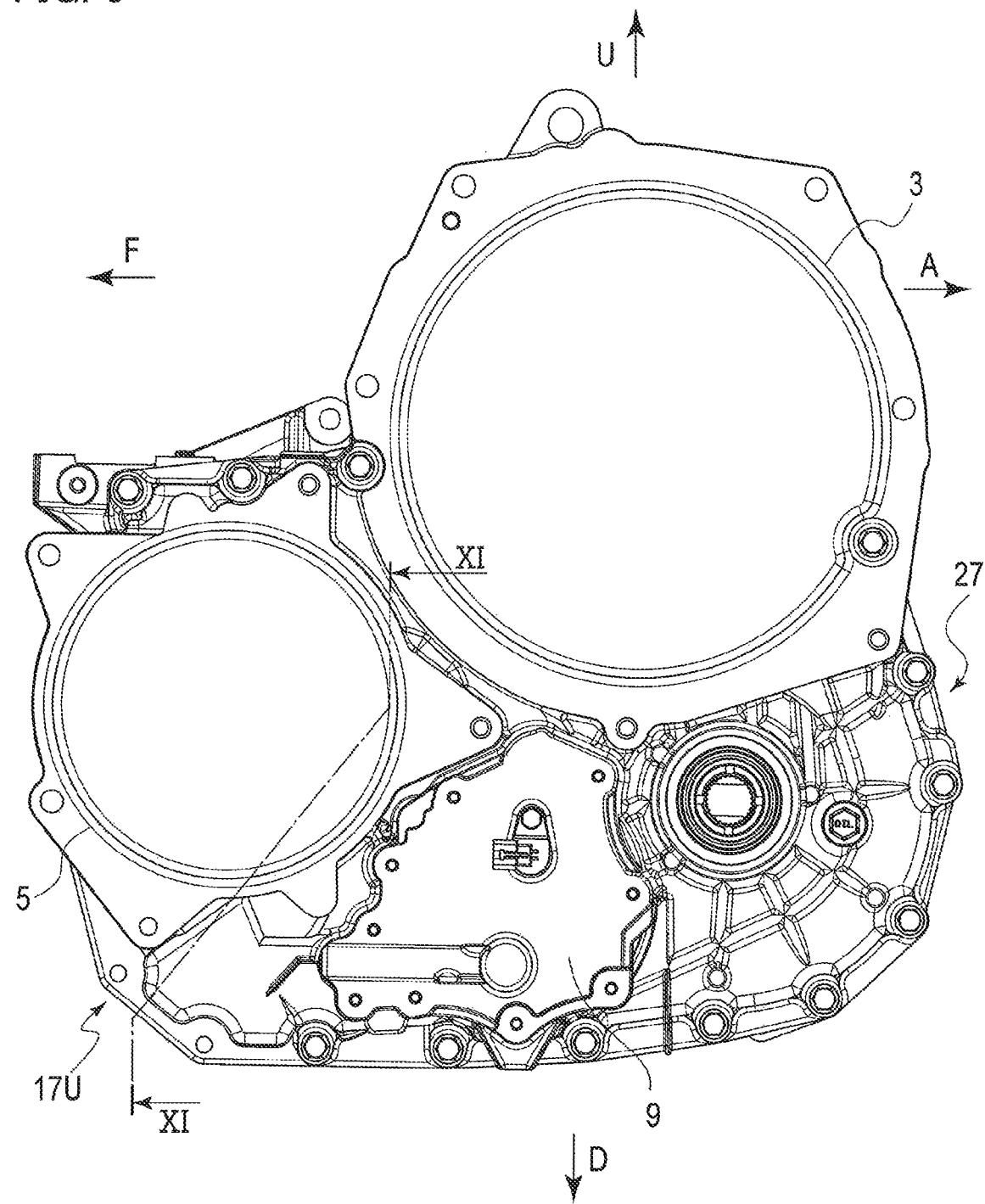
FIG. 9 is a side view of the power transmission device.

As being understood from FIGS. 7 through 9, the electric motor 3, the generator 5, the combustion engine 7, and the clutch 9 as described above can be used in this embodiment without any modification and the arrangements thereof also need no modification. There will be no change in the sectional view passing centers of the respective shafts also in this embodiment as compared with that of FIG. 5.

Figure 10:
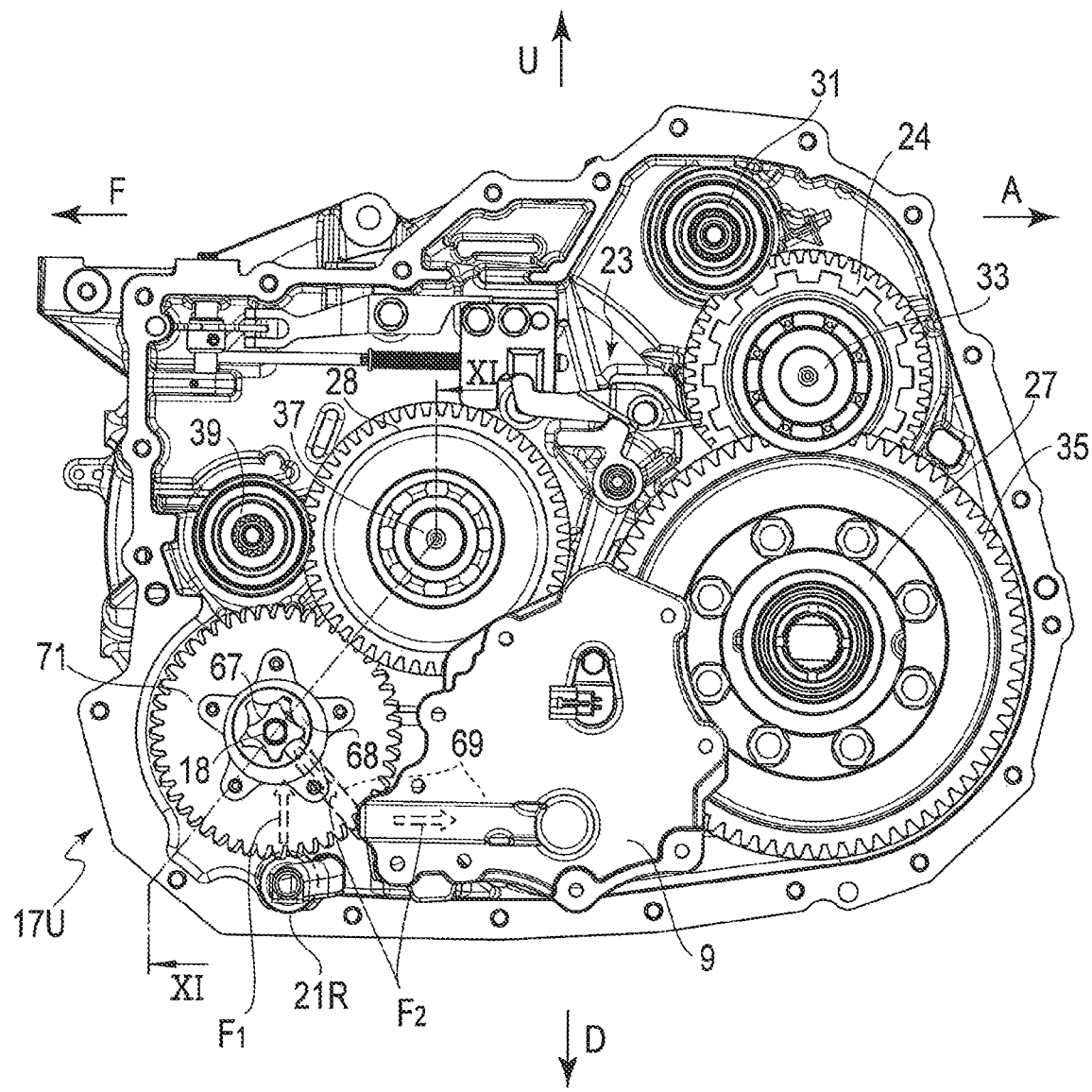
FIG. 10 is a side view of the interior of the power transmission device.
Figure 11:
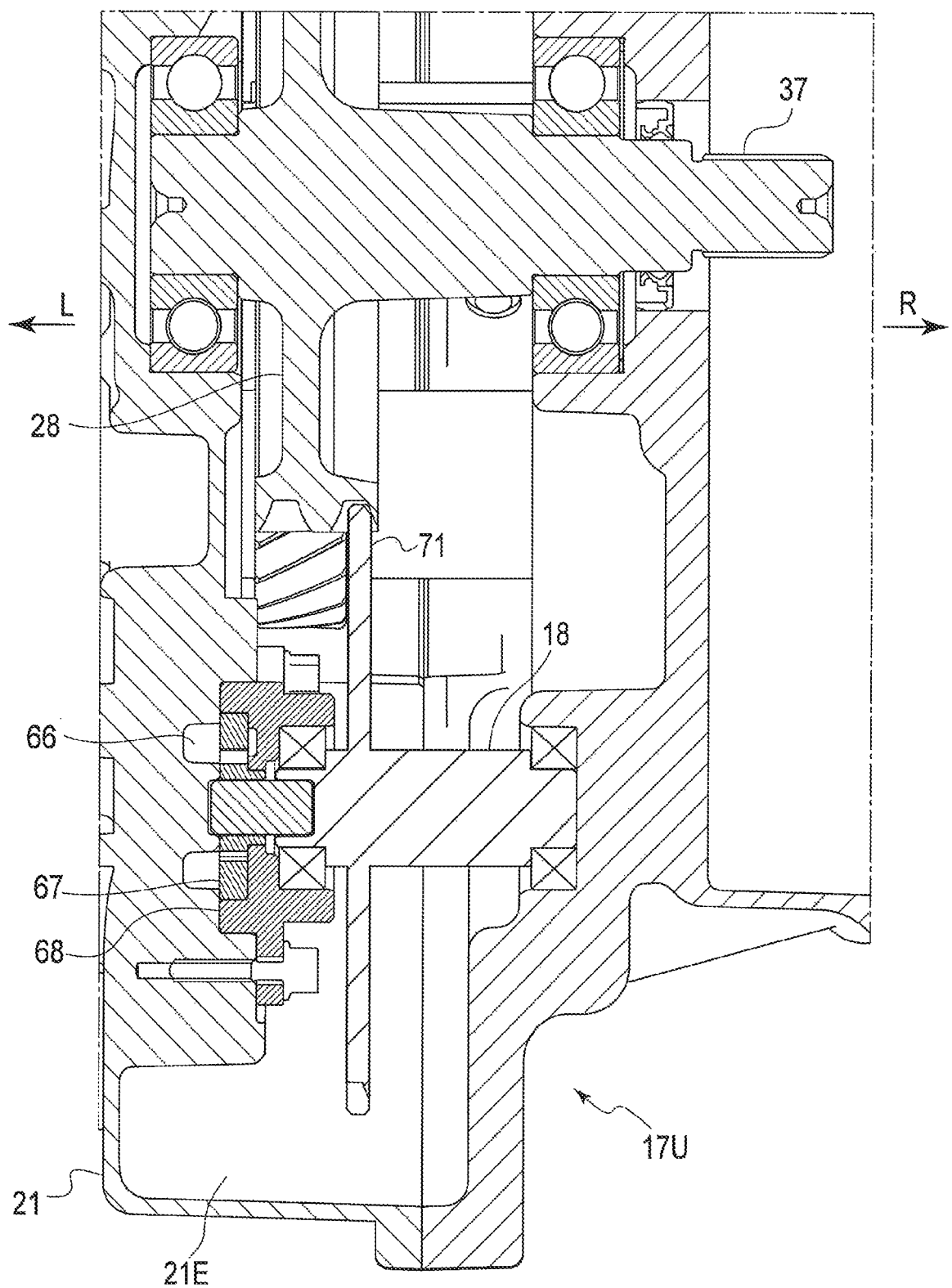
FIG. 11 is a sectional view of the power transmission device taken from lines XI-XI of FIGS. 9 and 10.

Referring to FIGS. 10, 11, the power transmission device 1 of the present embodiment is provided with a third gear set so as to use the generator 5 and/or the combustion engine 7 as the power source. The third gear set is disposed within the casing 21 and is comprised of a ring gear 28 and a ring gear 71 in mesh therewith. Or, a ring gear 71 may be in mesh with the pinion 30. Further alternatively, the shaft 37 is provided with another gear independent from the ring gear 28 and the ring gear 71 may be in mesh with said another gear.

As described above, the ring gear 28 is drivingly coupled with the combustion engine 7 and the pinion 30 with the generator 5, respectively. Further the ring gear 28 and the pinion 30 are mutually in mesh. Therefore, when either the combustion engine 7 or the generator 5 comes in operation, the ring gear 71 rotates, thereby rotating the shaft 18.

A tooth face width of the ring gear 28 or any other gear, and a tooth face width of the ring gear 71, can be properly broadened. As they have sufficient face widths, the meshing ratio of the ring gear 71 is improved and this leads to improvement of vibration reduction and the quality of quietness.

As with the former embodiment, the pump 17 projecting out of the casing 21 can be used, or a pump 17U housed in the casing 21 can be used. As being understood by comparing FIGS. 8, 9 with FIGS. 3, 4, the casing 21 of the present embodiment can be made compact in both the lateral direction and the longitudinal direction around the pump 17U.

In a case of using a type of a trochoid pump for instance, the pump 17U is provided with an inner rotor 67 coupled with and rotating along with the shaft 18, an outer rotor 68 fitting on and rotatable about its outer periphery, and flow paths 66, 69 in communication with spaces therebetween.

The outer periphery of the inner rotor 67 forms a star shape. The outer rotor 68 is provided with an inner periphery forming a star shape corresponding thereto, and fits on the inner rotor 67 but is eccentric from the inner rotor 67. When the inner rotor 67 rotates, the outer rotor 68 follows it to rotate, but, being eccentric, the spaces between the inner rotor 67 and the outer rotor 68 repeat expansion and contraction. The expansion causes the operation oil in the inflow-side flow path 66 to be drawn into these spaces and the contraction causes it to be pressed out to the outflow-side flow path 69.

The pump 17U may be disposed around the lowermost point in the space 21E in the casing 21, which functions as an oil reservoir 21R. Specifically, the oil reservoir 21R may be disposed just below the pump 17U. The oil reservoir 21R is in communication with the inflow-side flow path 66 and the pump 17U sucks the operation oil F1, pressurizes it by rotation of the rotors 67, 68, and supplies the pressurized fluid F2 through the flow path 69 to the reservoir 61.

As the oil reservoir 21R and the flow path 69 can be disposed approximately at a same height, the pump 17U can supply the pressurized fluid with small energy loss. Further, if the oil reservoir 21R is disposed just below it, the length of the flow path where the operation oil goes is minimized. Specifically, this arrangement significantly contributes to reduction of energy loss.

Meanwhile in the present embodiment, or also in the former embodiment, the power transmission device 1 may be provided with a park-lock device 23 for halting the first gear set 25.

When the clutch 9 is to be driven, the clutch 9 has then not yet been connected. The third gear set is then isolated from the first gear set 25 and the differential 27 and therefore rotation of the pump 17U is freed therefrom. Specifically, even when the vehicle stops, as long as either the combustion engine 7 or the generator 5 is in operation, its driving force can be used to drive the clutch 9. The present embodiment can also enjoy the benefit that the generator 5 can use electric power stored in the battery 13 to come into operation at any given time. In the phase of size reduction of the casing 21, the present embodiment is more advantageous than the former embodiment.

Commonly in all the embodiments described above, the operation oil pressurized and supplied by the pump 17, 17U driven by the second power source or the third power source spreads not only to the clutch 9 but also over the power transmission device 1, thereby lubricating the electric motor 3, the generator 5, the respective shafts, the gear and the bearing. In addition, the flow path 69 may be connected to the park-lock device 23 and then be used to switch it (for instance, to switch operation conditions by supplying hydraulic pressure to a bidirectional cylinder). Further, this pressurized operation oil is beneficial in cooling the electric motor 3 and the generator 5.

Meanwhile, the second power source can be either a generator or a combustion engine, or a combination of both, of course. Further, respective casings for the electric motor and the generator may be a unitary body with or separate bodies from the casing 21. Still further, rotors and stators of the electric motor and the generator may be in the interior or at the exterior of the casing 21.

As described already, the pump 17, 17U can be any of a gear pump, a vane pump or a plunger pump, and alternatively any pump of a proper type such as a screw pump could be used. In any case, there's not any obstruction for accommodating the pump 17, 17U in the casing 21. Alternatively, in a case where the pump 17, 17U projects out of the casing 21 or is disposed outside the casing 21, it does not occupy a large space but is no more than a presence capable of hiding below the generator 5. Therefore the casing 21 can be formed compactly.

On the outflow-side flow path 69, preferably close to the pump 17, 17U, any regulation valve may be interposed. The regulation valve can regulate flow rate of the pressurized fluid F2 but does not increase flow resistance. The flow paths may be modified so that the operating oil exhausted out of the regulation valve is, without going through the strainer 65, retrieved to the inflow-side flow path 66 at any location close to the pump 17, 17U. As this exhausted oil does not fall down to the oil reservoir 21R, resistance for sucking the operation oil does not increase.

In addition to the pump 17, 17U, any other pump may be added. The latter pump may be connected to the shaft 18 of the electric motor 17 or driven by any driving force extracted from any other shaft. By using the latter pump, circulation of the lubricant oil within the casing 21 increase and thereby cooling efficiency for the respective elements can be improved.

Although certain exemplary embodiments are described above, modifications and variations of the embodiments will occur to those skilled in the art, in light of the above teachings.

INDUSTRIAL APPLICABILITY

A power transmission device is provided, which solves a problem of layout.

The invention claimed is:

1. A power transmission device outputting torque from a first power source and a second power source to axles, comprising:
    a first shaft coupled with the first power source;
    a differential configured to differentially distribute the torque to the axles;
    a first gear set configured to drivingly couple the first shaft with the differential;
    a second shaft coupled with the second power source;
    a second gear set drivingly coupled with the second shaft;
    a clutch configured to receive fluid pressure to drivingly and releasably couple the second gear set with the first gear set;
    a third gear set drivingly coupled with the second power source;
    a pump driven by the third gear set to generate the fluid pressure, the pump being disposed separate from the clutch and in fluid connection with the clutch to supply the fluid pressure;
    a casing defining a single space so dimensioned as to house the first and second shafts, the differential, the first, second and third gear sets, the pump and the clutch, the casing including an oil reservoir disposed around a lowermost point in the space and just below the pump; and
    a flow path passing through the casing and establishing fluid communication between the pump and the clutch.

2. The power transmission device of claim 1, wherein the flow path includes a horizontal part.

3. The power transmission device of claim 1, wherein the flow path is directed downward from the pump toward the clutch.

4. The power transmission device of claim 1, wherein the pump and the clutch are disposed below the first shaft, the second shaft and an axis of the differential.

5. The power transmission device of claim 1, further comprising:
    a third shaft drivingly coupled with the second shaft via the second gear set,
    wherein the pump is disposed below the third shaft.

* * * * *